(12) United States Patent
Smith et al.

(10) Patent No.: US 6,320,600 B1
(45) Date of Patent: Nov. 20, 2001

(54) WEB-BASED VIDEO-EDITING METHOD AND SYSTEM USING A HIGH-PERFORMANCE MULTIMEDIA SOFTWARE LIBRARY

(75) Inventors: Brian C. Smith, Fort Worth, TX (US); Wei-Tsang Ooi, Ithaca, NY (US)

(73) Assignee: Cornell Research Foundation, Inc., Itchaca, NY (US)

(*) Notice: Subject to any disclaimer, the term of this patent is extended or adjusted under 35 U.S.C. 154(b) by 0 days.

(21) Appl. No.: 09/212,341

(22) Filed: Dec. 15, 1998

(51) Int. Cl.[7] .................................................. H04N 7/173
(52) U.S. Cl. .......................... 345/723; 725/109; 725/112; 725/114; 348/722
(58) Field of Search ............................ 348/722; 345/328; 709/219; 725/109, 112, 114

(56) References Cited

U.S. PATENT DOCUMENTS

| | | | |
|---|---|---|---|
| 5,237,688 | 8/1993 | Calvert et al. | 395/700 |
| 5,367,621 | 11/1994 | Cohen et al. | 395/154 |
| 5,500,881 | 3/1996 | Levin et al. | 395/700 |
| 5,537,546 | 7/1996 | Sauter | 395/200.01 |
| 5,553,290 | 9/1996 | Calvert et al. | 395/700 |
| 5,564,048 | 10/1996 | Eick et al. | 395/600 |
| 5,640,560 | 6/1997 | Smith | 395/615 |
| 5,652,714 | 7/1997 | Peterson et al. | 364/550 |
| 5,737,495 | 4/1998 | Adams et al. | 395/615 |
| 5,737,552 * | 4/1998 | Lavallee et al. | 395/328 |
| 5,742,797 * | 4/1998 | Celi, Jr. et al. | 395/507 |
| 5,745,126 * | 4/1998 | Jain et al. | 345/952 |
| 5,748,961 | 5/1998 | Hanna et al. | 395/701 |
| 5,758,093 | 5/1998 | Boezeman et al. | 395/200.79 |
| 5,835,163 * | 11/1998 | Liou et al. | 348/700 |
| 5,850,352 * | 12/1998 | Moezzi et al. | 364/514 A |
| 5,903,816 * | 5/1999 | Broadwin et al. | 455/3.1 |
| 5,963,203 * | 10/1999 | Goldberg et al. | 345/328 |
| 6,104,441 * | 8/2000 | Wee et al. | 348/722 |
| 6,154,771 * | 11/2000 | Rangan et al. | 709/217 |

* cited by examiner

*Primary Examiner*—Andrew Faile
*Assistant Examiner*—Kieu-Oanh Bui
(74) *Attorney, Agent, or Firm*—Perkins, Smith & Cohen, LLP; Christine M. Kuta; Jacob N. Erlich (57) ABSTRACT

A Web-based video-editing system using a high-performance multimedia software library having a toolkit, the toolkit being a set of reusable, high-performance primitives and abstractions that are at an intermediate level of abstraction between C and conventional libraries. By decomposing common multimedia data types and operations into thin abstractions and primitives, programs written using the toolkit achieve performance competitive with hand-tuned C code, but which are shorter and more reusable. The toolkit programs can employ optimizations that are difficult to exploit in C and are impossible to use in conventional libraries.

17 Claims, 6 Drawing Sheets

```
1   void PIP(image, borderWidth, margin)
2     ByteImage *image;
3     int borderWidth, margin;
4   {
5         int w  = ByteGetWidth(image);
6         int h  = ByteGetHeight(image);
7         int destW = w/2;
8         int destH = h/2;
9         int destX = w - destW - margin;
10        int destY = h - destH - margin;
11        ByteImage *dest;
12        ByteImage *temp;

13    temp = ByteNew(destW,destH);
14    ByteShrink2x2(image, temp);

15        dest = ByteClip(image,
16           destX-borderWidth, destY-borderWidth,
17           destW+2*borderWidth,destH+2*borderWidth);
18        ByteSet(dest, 255);
19        ByteFree(dest);

20        dest = ByteClip(image,
21           destX, destY, destW, destH);
22        ByteCopy(temp, dest);
23    ByteFree(dest);
24    ByteFree(temp);
25    }
```

```
// file is the input sources for the MPEG streams
1  BitStream  *inbs = BitStreamNew (65536);
2  BitParser  *inbp = BitParserNew ();
3  MpegSeqHdr *seqhdr = MpegSeqHdrNew ();
4  MpegPicHdr *pichdr = MpegPicHdrNew ();
5  int w, h, vbvsize, done=0;
6  BitParserAttach (inbp, inbs);
7  BitStreamFileRead (inbs, file, 0);
8  MpegSeqHdrFind (inbp);
9  MpegSeqHdrParse (inbp, seqhdr);
10 w = seqhdr->width;
11 h = seqhdr->height;
12 vbvsize = seqhdr->vbv_buf_size;
13 r = ByteNew(w, h);
14 g = ByteNew(w, h);
15 b = ByteNew(w, h);
16 y = ByteNew(w, h);
17 u = ByteNew(w/2, h/2);
18 v = ByteNew(w/2, h/2);
19 dcty  = DctNew(w/16, h/16);
20 dctu  = DctNew(w/32, h/32);
21 dctv  = DctNew(w/32, h/32);
22 while (!done) {
23    int marker;
24    mpeg_any_markerFind (inbp);
25    marker = MpegGetCurrMarker (inbp);
26    switch (marker) {
27     case PIC_HDR_MARKER :
28        MpegPicHdrParse (inbp, pichdr);
29        if (pichdr->type == I_FRAME) {
30           MpegPicIParse (inbp,dcty,dctu,dctv);
31           DctToByte (dcty, y);
32           DctToByte (dctu, u);
33           DctToByte (dctv, v);
34           YuvToRgb420 (y, u, v, r, g, b);
35        }
36        break;
37     case GOP_HDR_MARKER :
38        MpegGopHdrSkip (inbp);
39        break;
40     case SEQ_END_MARKER :
41        done = 1;
42    }
43    if (!done) {
44       UpdateIfUnderflow (inbp,inbs,file,vbvsize);
45    }
46 }
```

FIG. 6

```
1  #define SIZE (128*1024)
2  int len, offset, start = 0;
3  MpegPktHdr *hdr = MpegPktHdrNew();
4  BitStream *bs = BitStreamNew (SIZE);
5  BitParser *bp = BitParserNew ();
6  BitStreamFilter * filter = BitStreamFilterNew();

7  BitParserAttach (bp, bs);
8  BitStreamFileRead (bs, file);

9  offset = MpegPktHdrFind (bp);
10 while (!eof(file) && !EndOfBitstream(bp)) {
11   MpegPktHdrParse (bp, hdr);
12   if (hdr->id == 32) {
13      len = hdr->len;
14      BitStreamFilterAdd(filter, offset, len);
15      start += UpdateIfUnderflow (bp,bs,file,SIZE);
16      offset = start + MpegPktHdrFind(bp);
17   }
18 }
```

FIG. 7

WEB-BASED VIDEO-EDITING METHOD AND SYSTEM USING A HIGH-PERFORMANCE MULTIMEDIA SOFTWARE LIBRARY

STATEMENT OF GOVERNMENT INTEREST

This invention was partially funded by the Government under a grant from DARPA. The Government has certain rights in portions of the invention.

FIELD OF THE INVENTION

This invention relates generally to multimedia software and more particularly to libraries for use in building processing-intensive multimedia software for Web-based video-editing applications.

BACKGROUND OF THE INVENTION

The multimedia research community has traditionally focused its efforts on the compression, transport, storage and display of multimedia data. These technologies are fundamentally important for applications such as video conferencing and video-on-demand. The results of these efforts have made their way into many commercial products. For example, JPEG and MPEG, described below, are ubiquitous standards from image and audio/video compression.

There are, however, problems in content-based retrieval and understanding, video production, and transcoding for heterogeneity and bandwidth adaptation. The lack of a high-performance library, or "toolkit", that can be used to build processing-intensive multimedia applications is hindering development in multimedia applications. In particular, in the area of video-editing, large volumes of data need to be stored, accessed and manipulated in an efficient manner. Also, special hardware, such as MPEG accelerators, are needed for video processing applications. Solutions to the problems of storing video data include client-server applications and editing over the World Wide Web (Web). Web-based video-editing is particularly desirable because it allows access to data stored in many different repositories, and special hardware may be distributed. With Web-based video-editing, any computer with Internet access may be used to do video-editing because no special storage capability or processing capability is needed at the local level. The existing multimedia toolkits, however, do not have sufficiently high performance to make Web-based applications practical.

The data standards GIF, JPEG and MPEG dominate image and video data in the current state of the art. GIF (Graphics Interchange Format) is a bit-mapped graphics file format used commonly on the Web. JPEG (Joint Photographic Experts Group) is the internationally accepted standard for image data. JPEG is designed for compressing full color or gray-scale still images. For video data, including audio data, the international standard is MPEG (Moving Picture Experts Group). MPEG is actually a general reference to an evolving series of standards. For the sake of simplicity, the various MPEG versions will be referred to as the "MPEG standard" or simply "MPEG". The MPEG standard achieves a high rate of data compression by storing only the changes from one frame to another instead of an entire image.

The MPEG standard has four types of image coding for processing, the I-frame, the P-frame, the B-frame and the D-frame (from an early version of MPEG, but absent in later standards).

The I-frame (Intra-coded image) is self-contained, i.e. coded without any reference to other images. The I-frame is treated as a still image, and MPEG uses the JPEG standard to encode it. Compression in MPEG is often executed in real time and the compression rate of I-frames is the lowest within the MPEG standard. I-frames are used as points for random access in MPEG streams.

The P-frame (Predictive-coded frame) requires information of the previous I-frame in an MPEG stream, and/or all of the previous P-frames, for encoding and decoding. Coding of P-frames is based on the principle that areas of the image shift instead of change in successive images.

The B-frame (Bi-directionally predictive-coded frame) requires information from both the previous and the following I-frame and/or P-frame in the MPEG stream for encoding and decoding. B-frames have the highest compression ratio within the MPEG standard.

The D-frame (DC-coded frame) is intra-frame encoded. The D-frame is absent in more recent versions of the MPEG standard, however, applications are still required to deal with D-frames when working with the older MPEG versions. D-frames consist only of the lowest frequencies of an image. D-frames are used for display in fast-forward and fast-rewind modes. These modes could also be accomplished using a suitable order of I-frames.

Video information encoding is accomplished in the MPEG standard using DCT (discrete cosine transform). This technique represents wave form data as a weighted sum of cosines. DCT is also used for data compression in the JPEG standard.

Currently, there are several inadequate options from which to choose in order to make up for the lack of a high-performance multimedia toolkit. First, code could be developed from scratch as needed in order to solve a particular problem, but this is difficult given the complex multimedia standards such as JPEG and MPEG. Second, existing code could be modified but this results in systems that are complex, unmanageable, and generally difficult to maintain, debug, and reuse. Third, existing standard libraries like ooMPEG of the MPEG standard, or Independent JPEG Group (IJP) of the JPEG standard could be used, but the details of the functions in these libraries are hidden, and only limited optimizations can be performed.

It remains desirable to have a high-performance toolkit for multi-media processing.

It is an object of the present invention to provide a method and apparatus to enable client-server video-editing.

It is another object of the present invention to provide a method and apparatus to enable Web-based video-editing.

SUMMARY OF THE INVENTION

The problems of Web-based video-editing are solved by the present invention of incorporating a high-performance library as part of the video processing application. The Web-based video editor has a graphical user interface (GUI), a GUI-to-backend interface, and a backend video-editing engine. The high performance library enables the interface and the engine to perform video-editing tasks with low latency over the Web. The high-performance library includes a set of simple, interoperable, high-performance primitives and abstractions that can be composed to create higher level operations and data types. The libraries of the present invention lie between a high level API and low level C code. The libraries expose some low level operations and data structures but provide a higher level of abstraction than C code.

The libraries give users full control over memory utilization and input/output (I/O) because none of the library routines implicitly allocate memory or perform I/O. The libraries provide thin primitives, and functions which expose the structure of the bitstream.

The present invention together with the above and other advantages may best be understood from the following detailed description of the embodiments of the invention illustrated in the drawings, wherein:

DETAILED DESCRIPTION OF PREFERRED EMBODIMENTS

Figure 1:
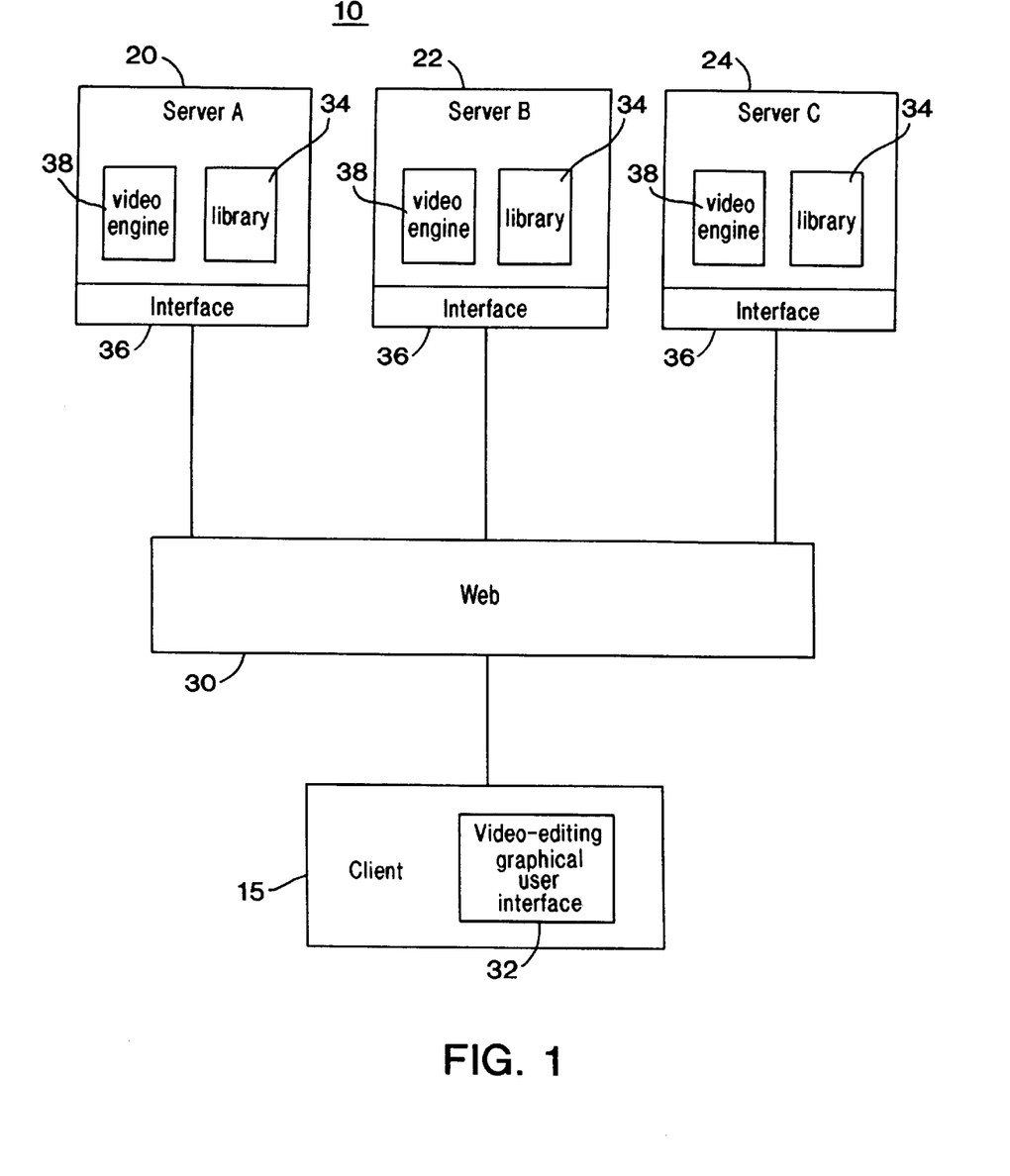
FIG. 1 is a block diagram of a Web-based video-editing system having high-performance libraries according to principles of the invention.

FIG. 1 shows a client/server Web-based video-editing system 10. A client computer (client) 15 is able to connect to a plurality of servers 20, 22, 24 over the Web 30. The client 15 runs a video-editing graphical user interface (GUI) 32. In the present embodiment, the GUI 32 may be implemented in a language such as Java. Java is a cross-platform objected-oriented language designed for secure execution of code across a network. The GUT 32 creates a workspace on the client computer 15 where video frames may be viewed, cut, copied and inserted in a video sequence. The processing and data storage, however, is done remotely over the Web 30 as will be described below.

In the present embodiment, the Web 30 is used to connect the client 15 and the servers 20, 22, 24, however in alternative embodiments, other types of networks could be used to form the client-server connection. A GUI-to-backend interface 36 creates a connection between the GUI 32 on the client 15 and the video engines 38 on each of the Web servers 20, 22, 24. The interface 36 is enabled using the libraries 34 of the present invention. The interface 36 includes a buffer where video sequence data is stored for processing at the servers 20, 22, 24. In the present embodiment of the invention, the video sequence data is compressed video bitstream data in the MPEG format. The servers 20, 22, 24 store audio and visual video data, and the back-end video-processing engines 38 have multimedia processing applications to process that data.

In operation, the client 15 sends a request for a download from one of the Web servers, for example Server A 20. The Web server 20 transfers the Java code which implements the GUI 32 to the client 15 and the client 15 makes a TCP connection to the Web server 20. The server 20 listens to a port whose number is embedded in the Java program transmitted to the client 15. At the client's request for the TCP connection, the Web server 20 accepts the connection by creating a thread for a new client handler on the server 20. The client handler acts as a message passing entity between the client 15 and the video-processing engines 38 on the server 20. The video operations are performed on the server end to minimize the traffic in the TCP socket connection over the network, and the client 15 sends simple video editing messages to the back end video engines 38 to perform the video operations.

In the present embodiment of the invention, the process of creating the video-editing client/server relationship is implemented using various data objects. A server object on the server starts a thread object by passing in the port to which the server listens to incoming clients. The thread object then creates an activempegvector object to track all of the MPEG files that are opened by remote users. At this point of the process, the Web server is ready to accept clients. When a client request is received, the thread object forks out a new clienthandler instance which creates a protocol object at the back-end interface 36. The clienthandler object handles the sending and receiving operations between the GUI 32 and the Web server 20, 22, 24. The clienthandler object does not process the actual messages, but instead calls a method in the protocol object to do so. The protocol object does the actual message parsing and breaks up the messages into a generic format. The protocol object then calls the appropriate methods to handle the operation. After the server has finished the operation, it sends the image file location to the TCP socket for the client to receive at the GUI 32.

The interface 36 and the servers 20, 22, 24 have, as part of the video processing application, a high-performance library (or "toolkit") 34 according to the principles of the present invention. The toolkit can be used to build customized commands for video-editing such as concatenation, zooming in, zooming out, cutting out a portion of the video sequence, and transitional effects. The present invention will be described in terms of the MPEG standard, however the principle of the invention may apply to other data standards. In addition, the MPEG standard is an evolving standard and the principles of the present invention may apply to MPEG standards yet to be developed.

The high-performance toolkit 34 provides code with performance competitive with hand-tuned C code, which allows optimizations to be performed without breaking open abstractions and is able to be composed by users in unforeseen ways. In order to accomplish high performance multimedia data processing with predictable performance, resource control, and replacability and extensibility (i.e. usable in many applications), the present invention provides a toolkit, or API, was designed with the following properties.

The first property of the toolkit 34 is resource control. Resource control refers to control at the language level of I/O execution and memory allocation including reduction and/or elimination of unnecessary memory allocation. None of the toolkit routines of this invention implicitly allocate memory or perform I/O. The few primitives in the toolkit which do perform I/O, are primitives that load or store Bitstream data. The Bitstream is the actual stream of multimedia data. The MPEG bitstream will be discussed below. All other toolkit primitives of the invention use Bitstream as a data source. Users have full control over memory utilization and I/O. This feature gives users tight control over performance-critical resources, an essential feature for writing applications with predictable performance. The toolkit also gives users mechanisms to optimize programs using techniques such as data copy avoidance and to structure programs for good cache behavior.

The separation of I/O in the present invention has three advantages. First, it makes the I/O method used transparent to toolkit primitives. Generally, conventional libraries use integrated processing and I/O. A library that integrates file I/O with its processing is difficult to use in a network environment, because the I/O behavior of networks is different from that of files. Second, the separation of I/O also allows control of when I/O is performed. It enables, for example, the building of a multithreaded implementation of the toolkit that allows the use of a double buffering scheme to read and process data concurrently. Third, by isolating the I/O calls, the performance of the remaining functions becomes more predictable.

The toolkit of this invention provides two mechanisms for sharing memory between abstractions, i.e. data objects. These mechanisms are called clipping and casting.

Figure 2:
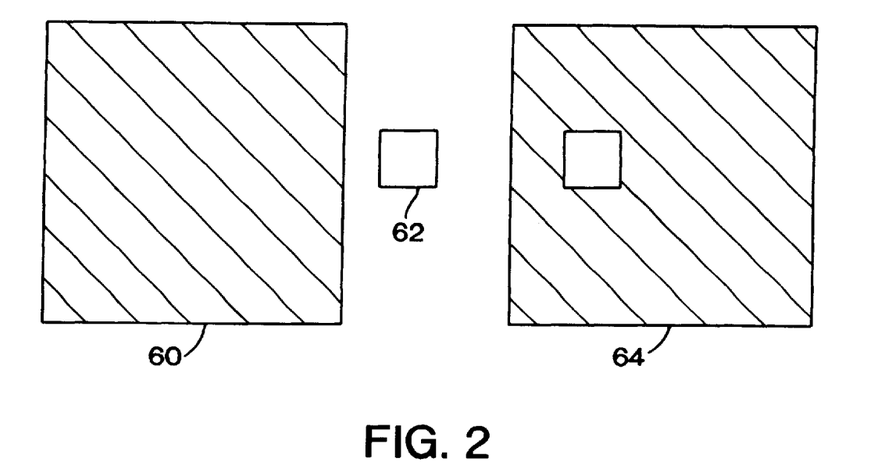
FIG. 2 is a schematic of memory clipping according to the principles of the invention.

In clipping, one object "borrows" memory from another object of the same type. An example usage of clipping can be seen in FIG. 2. In FIG. 2, the abstraction ByteImage (a 2D array of values in the range 0 . . . 255) is used to create a black box 60, then a gray box 62, and then the images are combined as a black box with a gray box inside 64 which share memory using the following pseudocode:

```
set a [byte_new 100 100]
    *** creates a new ByteImage of size 100 x 100 ***
byte_set $a 0
    *** initialize ByteImage to 0 (all black) ***
set b [byte_clip $a 30 30 20 20]
    *** creates a small ByteImage at position (30, 30)
        with dimensions of 20 x 20 inside $a. Both a and
        b share the same memory ***
byte_set $b 128    *** initializes little box to gray ***
byte_display $b    *** displays little gray box ***
bytedisplay $a
    *** displays black box with little gray box ***
```

Clipping functions are cheap in terms of memory usage because they allocate only an image header structure, and they are provided for in all of the toolkit's image and audio data types. Clipping is useful for avoiding unnecessary copying or processing of data. For example, if a user wants to decode only part of the gray scale image in an MPEG I-frame, the user could create a clipped DCTImage. A DCTImage is an array of DCT vectors, and a clipped DCTImage is an image that contains a subset of DCT blocks from the decoded I-frame. The user then performs an IDCT (inverse discrete cosine transform) on that clipped image to complete the decoding process. The advantage of this strategy is that it avoids performing the IDCT on encoded data that will not used.

Casting refers to sharing of memory between objects of different types. Casting is typically used for I/O, because all I/O is done through the BitStream. For instance, when a gray scale image file is read into the BitStream, the headers are parsed, and the remaining data is cast into a ByteImage. Casting avoids unnecessary copying of data.

In the toolkit, the user allocates and frees all non-trivial memory resources explicitly using new and free primitives, e.g., ByteImageNew and ByteImageFree (see Appendix A). Functions never allocate temporary memory. If such memory is required to complete an operation (scratch space, for example), the user must allocate it and pass it to the routine as a parameter. Explicit memory allocation allows the user to reduce or eliminate paging, and make the performance of the application more predictable.

For example, in the function ByteCopy, which copies one ByteImage to another, a potential problem is that the two ByteImages might overlap, e.g. if they share memory using clipping. A prior art method of implementing ByteCopy is:

```
ByteCopy (src, dest) {
    temp=malloc ( );
    memcpy src to temp;
    memcpy temp to dest;
    free (temp);
}
```

The implementation above allocates a temporary buffer, copies the source into the temporary buffer, copies the temporary buffers into the destination, and frees the temporary buffer. In contrast, the operation using the toolkit of the present invention is:

```
ByteCopy (src, dest) {
    memcpy src to dest;
}
temp=ByteNew ( );
ByteCopy (src, temp);
ByteCopy (temp, dest);
ByteFree (temp);
```

The toolkit ByteCopy operation of the present invention assumes that the source and the destination do not overlap, and it copies the source into the destination. The user must determine if the source and the destination overlap, and if they do, the user must allocate a temporary ByteImage and two ByteCopy calls as shown above.

The second property of the toolkit of this invention is that of having "thin" primitives. The toolkit breaks complex functions into simple functions that can be layered. This feature promotes code reuse and allows optimizations that would otherwise be difficult to exploit. For example, to decode a JPEG image, the toolkit provides three primitives: (1) a function to decode the bit stream into three DCTImages, one for each color component (the DCTImage is an array of DCT vectors), (2) a function to convert each DCTImage into a ByteImage (a simple image whose pixels are in the range 0 . . . 255), and (3) a function to convert from YUV color space to RGB color space.

Exposing this structure has several advantages. First, it promotes code reuse. For instance, the inverse DCT and color space conversion functions are shared by the JPEG and MPEG routines. Second, it allows optimizations that would be difficult to exploit otherwise. One such optimization is compressed domain processing. Another example is decoding a JPEG image to a gray scale image where only one DCTImage needs to be decompressed, the DCTImage representing the gray scale component.

Many toolkit primitives of the present invention implement special cases of a more general operation. The special cases can be combined to achieve the same functionality of the general operation, and have a simple, fast implementation whose performance is predictable. ByteCopy is one such primitive—only the special case of non-overlapping images is implemented.

Another example is image scaling (shrinking or expanding the image). Instead of providing one primitive that scales an image by an arbitrary factor, the toolkit provides five primitives to shrink an image (Shrink4x4, Shrink2x2, Shrink2x1, Shrink1x2, and ShrinkBilinear), and five primitives to expand an image. Each primitive is highly optimized and performs a specific task. For example, Shrink2x2 is a specialized function that shrinks the image by a factor of 2 in each dimension. It is implemented by repeatedly adding 4 pixel values together and shifting the result, an extremely fast operation. Similar implementations are provided for Shrink4x4, Shrink2x1, and Shrink1x2. In contrast, the function ShrinkBilinear shrinks an image by a factor between 1 and 2 using bilinear interpolation. Although arbitrary scaling can be achieved by composing these primitives, splitting them into specialized operations makes the performance predictable, exposes the cost more clearly to the user, and enables the user to produce very fast implementations.

The drawback to specialization in the present invention is that it can lead to an explosion in the number of functions in the API. Sometimes, however, the user can combine several primitives into one without sacrificing performance, which significantly reduces the number of primitives in the API. This principle is called generalization.

Figure 3:
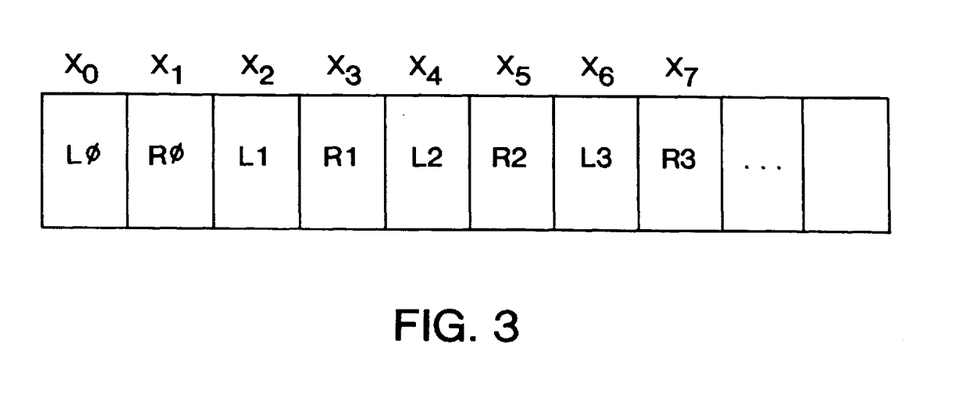
FIG. 3 shows stereo samples interleaved in memory.

A good example of generalization is found in the primitives that process AudioBuffers. AudioBuffers store mono or stereo audio data. Stereo samples from the left and right channels are interleaved in memory as shown in FIG. 3.

Suppose the user were implementing an operation that raises the volume on one channel (i.e., a balance control). One possible design is to provide one primitive that processes the left channel and another that processes the right channel as can be seen in the following code:

process_left
for (i=0, i<n, i +=2) { process x[i]
}
process_right
for (i=1, i<n, i +=2) {
}.

The two operations, however, can combined without sacrificing performance by modifying the initialization of the looping variable (1 for right, 0 for left). This implementation is shown in the following code:

process (offset)
for (i=offset; i<n, i +=2) { process x[i]
}.

In general, if specialization gives better performance, it is recommended. Otherwise, generalization should be used to reduce the number of functions in the API.

The third property of the toolkit of the present invention is that of exposing structure. Most libraries try to hide details of encoding algorithms from the user, providing a simple, high-level API. In contrast, the present invention exposes the structure of compressed data in two ways.

First the toolkit exposes intermediate structures in the decoding process. For example, instead of decoding an MPEG frame directly into RGB format, the toolkit breaks the process into three steps: (1) bit stream decoding (including Huffman decoding and dequantization), (2) frame reconstruction (motion compensation and IDCT), and (3) color space conversion. For example, the MpegPicParseP function parses a P frame from a BitStream and writes the results into three DCTImages and one VectorImage. A second primitive reconstructs pixel data from DCTImage and VectorImage data, and a third converts between color spaces. The important point is that the toolkit exposes the intermediate data structures, which allows the user to exploit optimizations that are normally impossible. For example, to decode gray scale data, one simply skips the frame reconstruction step on the Cr/Cb planes. Furthermore, compressed domain processing techniques can be applied on the DCTImage or VectorImage structures.

The toolkit of this invention also exposes the structure of the underlying bit stream. The toolkit provides operations to find structural elements in compressed bit streams, such as MPEG, JPEG and GIF. This feature allows users to exploit knowledge about the underlying bit stream structure for better performance. For example, a program that searches for an event in an MPEG video stream might cull the data set by examining only the I-frames initially, because they are easily (and quickly) parsed, and compressed domain techniques can be applied. This optimization can give several orders of magnitude improvement in performance over conventional event-searching methods in some circumstances, but because other libraries hide the structure of the MPEG bit stream from the user, this optimization cannot be used. In the present invention, this optimization is trivial to exploit. The user can use the MpegPicHdrFind function to find a picture header, MpegPicHdrParse to decode it, and, if the type field in the decoded header indicates the picture that follows is an I-frame, can use MpegIPicParse to decode the picture.

The toolkit provides a plurality of basic abstractions. These basic abstractions are:

ByteImage—a 2D array of values in the range 0 . . . 255.
BitImage—a 2D array of 0/1 values.
DCTImage—a 2D array of elements, each of which is a sequence of (index, value) pairs representing the run-length-encoded DCT blocks found in many block-based compression schemes, such as MPEG and JPEG.
VectorImage—a 2D array of vectors, each with a horizontal and vertical component, representing motion-vectors found in MPEG or H.261.
AudioBuffer—a 1D array of 8 or 16-bit values.
ByteLUT—a look-up table for ByteImages. A ByteLUT can be applied to one ByteImage to produce another ByteImage.
AudioLUT—a look-up tables for AudioBuffers.
BitStream/BitParser—A BitStream is a buffer for encoded data. A BitParser provides a cursor into the BitStream and functions for reading/writing bits from/to the BitStream.
Kernel—2D array of integers, used for convolution.
Filter—a scatter/gather list that can be used to select a subset of a BitStream.

These abstractions can be used to represent common multimedia data objects. For example, A gray-scale image can be represented using a ByteImage.
A monochrome image can be represented using a BitImage.
An irregularly shaped region can be represented using a BitImage.
An RGB image can be represented using three ByteImages, all of the same size.
An YUV image in 4:2:0 format can be represented using three ByteImages. The ByteImage that represents the Y plane is twice the width and height of the ByteImages that represent the U and V planes.
The DCT blocks in a JPEG image, an MPEG I-frame, or the error terms in an MPEG P- and B-frame can be represented using three DCTImages, one for each of the Y, U and V planes of the image in the DCT domain.
The motion vectors in MPEG P- and B-frame can be represented with a VectorImage.
A GIF Image can be represented using three ByteLUTs, one for each color map, and one ByteImage for the color-mapped pixel data.
8 or 16-bit PCM audio, 16-bit PCM audio, $\mu$-law or A-law audio data can be represented using an AudioBuffer. The audio can be either stored as single channel or contain both left and right channels.

The toolkit also has abstractions to store encoding-specific information. For example, an MpegPicHdr stores the information parsed from a picture header in an MPEG-1 video bit stream. The full list of header abstractions can be found in Table 1.

TABLE 1

Header abstractions

| Header | File Format |
| --- | --- |
| PnmHdr | NETPBM image header |
| WavHdr | WAVE audio header |
| GifSeqHdr | GIF file sequence header |
| GifImgHdr | GIF file image header |
| JpegHdr | JPEG image header |
| JpegScanHdr | JPEG scan header |
| MpegAudioHdr | MPEG-1 audio (layer 1, 2, 3) header |
| MpegSeqHdr | MPEG-1 video sequence header |
| MpegGopHdr | MPEG-1 video group-of-picture header |
| MpegPicHdr | MPEG-1 video picture header |
| MpegSysHdr | MPEG-1 system stream system header |
| HpegPckHdr | MPEG-1 system stream pack header |
| MpegPktHdr | MPEG-1 system stream packet header |

Although the set of abstractions defined in the toolkit is fairly small, the set of operators that manipulate these abstractions is not (see Appendix A).

The following examples, relating to the present invention, illustrate the use of the abstractions in the toolkit and demonstrate writing programs using the toolkit. The first example shows how to use the toolkit to manipulate images. The second example shows how to use the toolkit's primitives and abstractions for MPEG decoding. The third example shows how to use a toolkit filter to demultiplex an MPEG systems stream.

The first example is a simple example of using the toolkit to manipulate images. The ByteImage function will be used. A ByteImage consists of a header and a body. The header stores information such as width and height of the ByteImage and a pointer to the body. The body is a block of memory that contains the image data. A ByteImage can be either physical or virtual. The body of a physical ByteImage is contiguous in memory, whereas a virtual ByteImage borrows its body from part of another ByteImage (called its parent). In other words, a virtual ByteImage provides a form of shared memory—changing the body of a virtual ByteImage implicitly changes the body of its parent, as seen in FIG. 2.

A physical ByteImage is created using ByteNew(w,h). A virtual ByteImage is created using ByteClip(b, x, y, w, h). The rectangular area whose size is w×h and has its top left corner at (x,y) is shared between the virtual ByteImage and the physical ByteImage. The virtual/physical distinction applies to all image types in the toolkit. For example, a virtual DCTImage can be created to decode a subset of a JPEG image.

In an operation of creating a "picture in picture" (PIP) effect on an image, the steps creating the PIP effect are as follows: Given an input image (1) scale the image by half, (2) draw a white box slightly larger than the scaled image on the original image, and (3) paste the scaled image into the white box.

Figure 4:
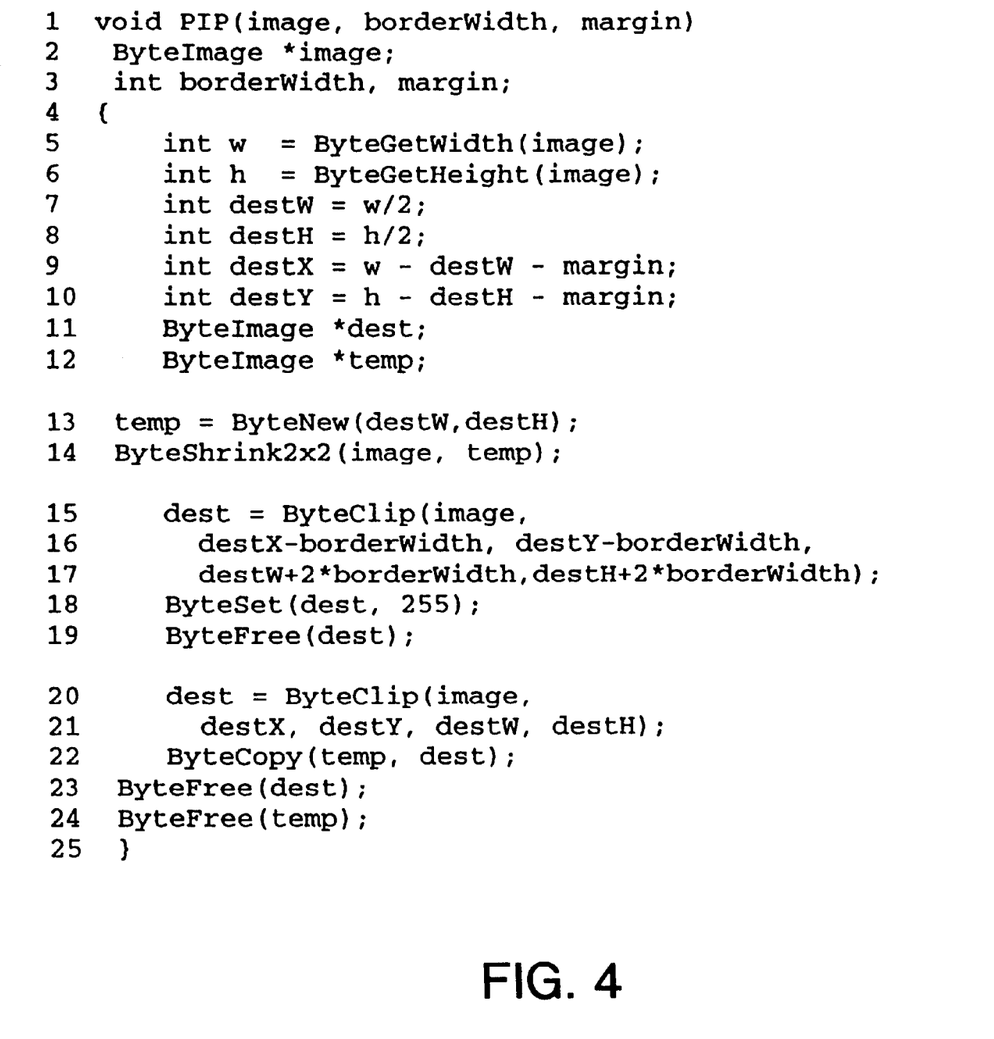
FIG. 4 shows a library function that performs the picture in picture operation according to principles of the invention.

The code in FIG. 4 shows a toolkit function that performs the PIP operation. The function takes in three arguments: image, the input image; borderWidth, the width of the border around the inner image in the output, and margin, the offset of the inner image from the right and bottom edge of the outer image.

Line 5 to line 6 of the function query the width and height of the input image. Line 7 to line 10 calculate the position and dimension of the inner picture. Line 13 creates a new physical ByteImage, temp, which is half the size of the original image. Line 14 shrinks the input image into temp. Line 15 creates a virtual ByteImage slightly larger than the inner picture, and line 18 sets the value of the virtual ByteImage to 255, achieving the effect of drawing a white box. Line 19 de-allocates this virtual image. Line 20 creates another virtual ByteImage, corresponding to the inner picture. Line 21 copies the scaled image into the inner picture using ByteCopy. Finally lines 22 and 23 free the memory allocated for the ByteImages.

This example shows how images are manipulated in the toolkit through a series of simple, thin operations. It also illustrates several design principles of the toolkit, namely (1) sharing of memory (through virtual images), (2) explicit memory control (through ByteClip, ByteNew and ByteFree), and (3) specialized operators (ByteShrink2×2).

The second example relating to this invention illustrates how to process MPEG video streams using the toolkit. The example program decodes the I-frames in an MPEG video stream into a series of RGB images. To parse an MPEG video stream, the encoded video data is first read into a BitStream. A BitStream is a abstraction for input/output operations—that is, it is a buffer. To read and write from the BitStream, a BitParser is used. A BitParser provides functions to read and write data to and from the BitStream, plus a cursor into the BitStream.

Figure 5:
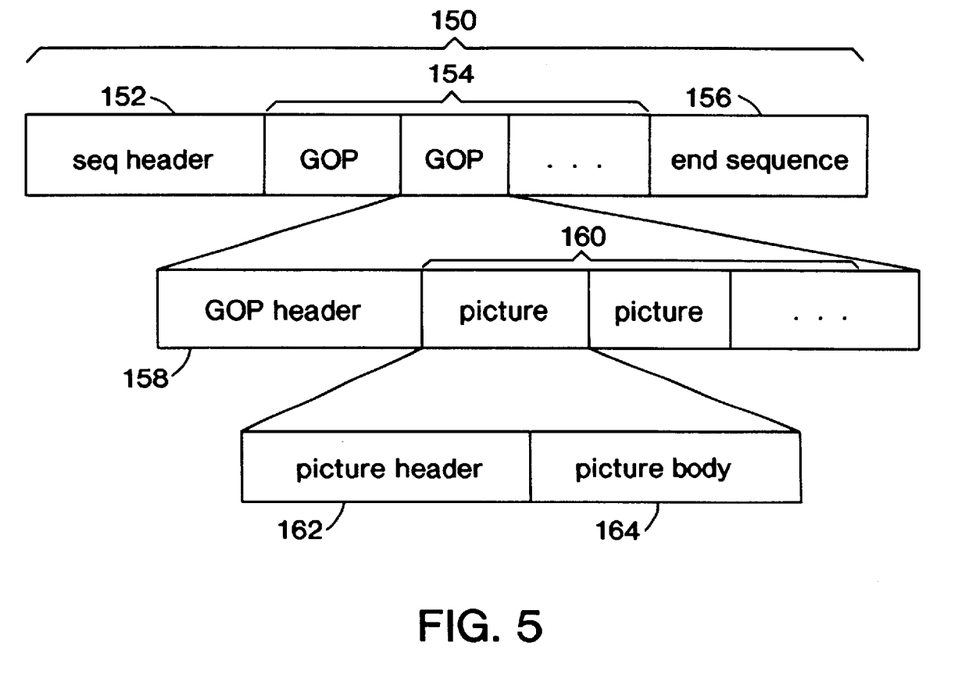
FIG. 5 shows the format of an MPEG-1 video stream.

FIG. 5 shows the format of an MPEG-1 video stream 150. The MPEG video stream 150 has of a sequence header 152, followed by a sequence of GOPs (group-of-pictures) 154, followed by an end of sequence marker 156. Each GOP consists of a GOP header 158 followed by a sequence of pictures 160. Each picture consists of a picture header 162, followed by a picture body 164 which is made up of compressed data required to reconstruct the picture. The sequence header 152 contains information such as the width and height of the video, the frame rate, the aspect ratio, and so on. The GOP header 158 contains the timecode for the GOP. The picture header 162 contains information necessary for decoding the picture, most notably the type of picture (I, P, B). The toolkit provides an abstraction for each of these structural elements (see Table 1).

The toolkit provides five primitives for each structural element: find, skip, dump, parse, and encode. Find positions the cursor in the BitStream just before the element. Skip advances the cursor to the end of the element. Dump moves the bytes corresponding to the element from input BitStream to the output BitStream, until the cursor is at the end of the header. Parse decodes the BitStream and stores the information into a header abstraction, and encode encodes the information from a header abstraction into a BitStream. Thus, the MpegPicHdrFind function advances the cursor to the next picture header, and MpegSeqHdrParse decodes the sequence header into a structure.

These primitives provide the necessary functions to find, skip, or parse MPEG I-frames. The parsed picture data from an MPEG I-frame is represented using a DCTImage. A DCTImage is similar to ByteImage, but each "pixel" is an 8×8 DCT encoded block.

Figure 6:
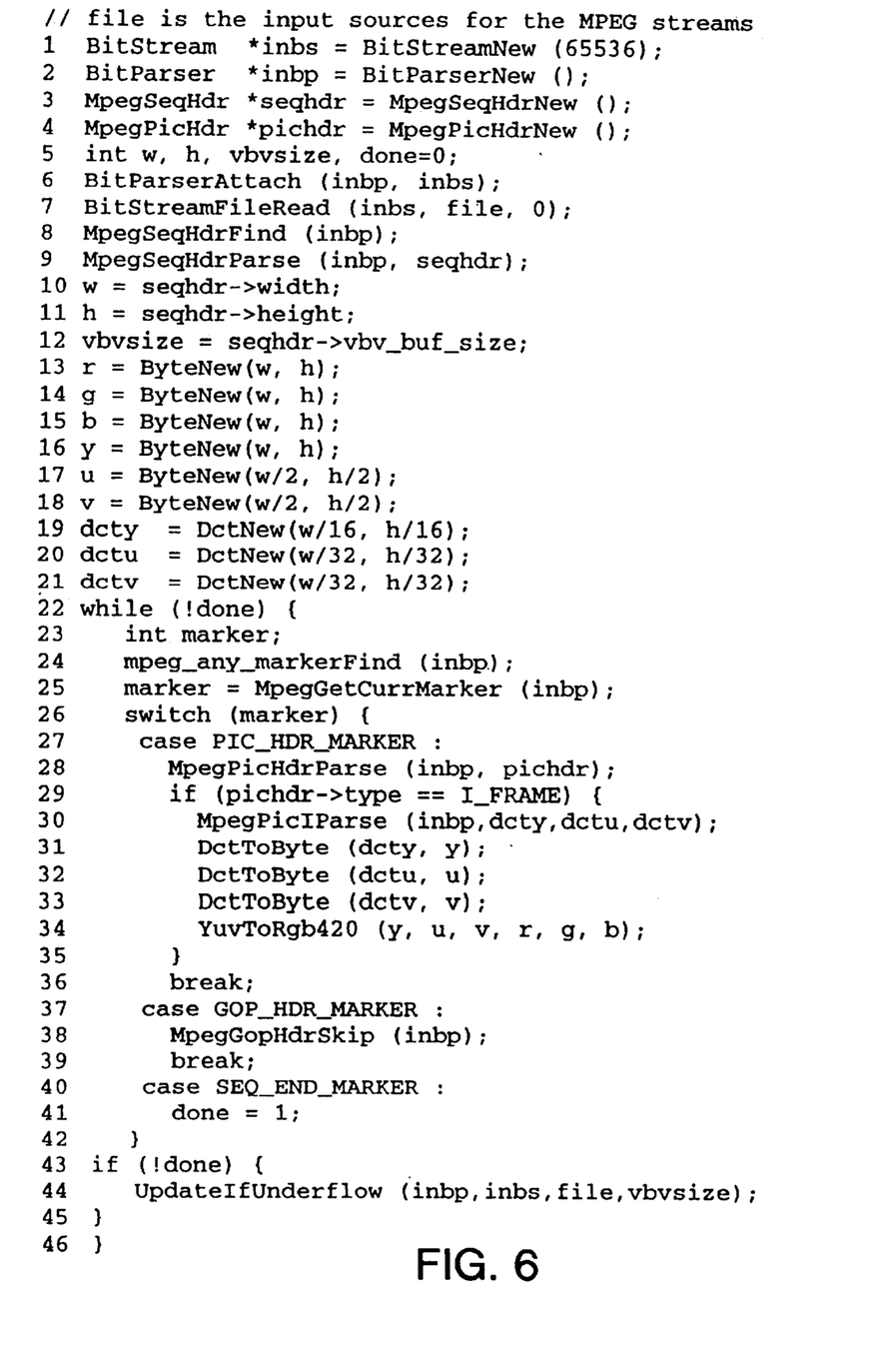
FIG. 6 shows a library function that decodes the I-frames in an MPEG video into RGB images according to principles of the invention; and, FIG. 7 shows a library function which acts as a filter that can be used to copy the packets of a first video stream from a system stream stored in a first BitStream to a second Bitstream according to principles of the invention.

The toolkit code in FIG. 6 decodes the I-frames in an MPEG video into RGB images. Lines 1 through 5 allocate the data structures needed for decoding. Line 6 attaches the BitParser inbp to BitStream inbs. The cursor of inbp will be pointing to the first byte of buffer in inbs. Line 7 fills inbs with 64K of data from the input MPEG video. Line 8 moves the cursor of inbp to the beginning of a sequence header, and line 9 parses the sequence header and stores the information from the sequence header into the structure seqhdr.

The vital information such as width, height and the minimum data that must be present to decode a picture (vbvsize) is extracted from the sequence header in lines 10 through 12. Lines 13 through 21 allocate the ByteImages and DCTImages we need for decoding the I-frames. Y, u, and v store the decoded picture in YUV color space, and r, g, and b store the decoded picture in RGB color space. Dcty, dctu, and dctv store compressed (DCT domain) picture data. The main loop in the decoding program (lines 22–46) starts by advancing the BitParser cursor to the beginning of the next marker (line 24) and retrieves the current marker (line 25).

If the marker indicates the beginning of a picture header, the picture header is parsed (line 28) and its type is checked (line 29). If the picture is an I-frame, the I-frame is parsed into three DCTImages, (line 30), the DCTImages are converted to ByteImages (lines 31–33), and the ByteImages are converted into RGB color space (line 34).

If the marker indicates the beginning of a GOP header, the header is skipped (which moves the cursor to the end of the GOP header), because information from the GOP header is not needed.

Finally, if the sequence end marker is encountered, that marks the end of the video stream and the loop is exited. Lines 43–45 ensure that, during the next iteration of the main loop, inbs will contain sufficient data to continue decoding. UpdateIfUnderflow checks if the number of bytes remaining in a inbs is less than vbvsize. If so, the remaining bytes are shifted to the beginning of the buffer and the rest of the buffer filled with data from file.

Breaking down complex decoding operations like MPEG decoding into "thin" primitives makes the toolkit code highly configurable. For example, by removing lines 32 to 34, the program decodes MPEG I-frame into gray scale images. By replacing line 31 to 34 with JPEG encoding primitives, an efficient MPEG I-frame to JPEG transcoder is produced.

The third example relating to this invention illustrates filtering out a subset of a BitStream for processing. Filters were designed to simplify the processing of bit streams with interleaved data (e.g., AVI, QuickTime, or MPEG systems streams). Filters are similar to scatter/gather vectors—they specify an ordered subset of a larger set of data.

A common use of filtering is processing MPEG system streams, which includes interleaved audio or video (A/V) streams. In MPEG, each A/V stream is assigned an unique id. Audio streams have ids in the range 0 . . . 31; video streams ids are in the range 32 . . . 47. The A/V streams are divided up into small (approx. 2 KByte) chunks, called packets. Each packet has a header that contains the id of the stream, the length of the packet, and other information (e.g., a timecode).

Figure 7:
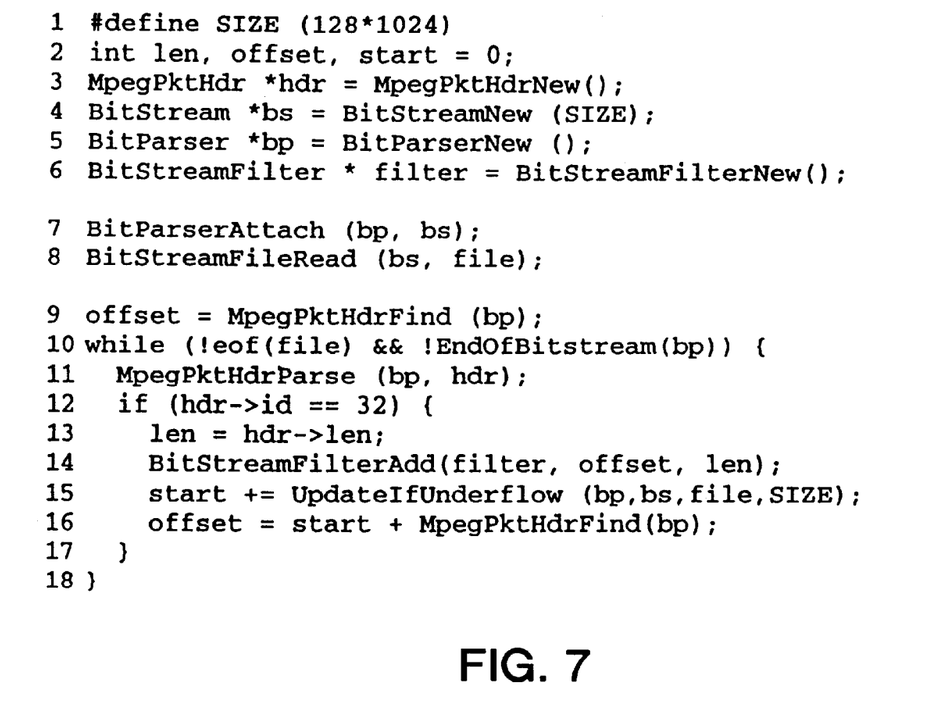

In this example, a filter is built that can be used to copy the packets of the first video stream (id=32) from a system stream stored in one BitStream to another. Once copied, the toolkit MPEG video processing primitives can be used on the video-only BitStream. The toolkit code for building this filter is shown in FIG. 7.

Lines 2 through 8 allocate and initialize various structures needed by this program. The variable offset stores the byte offset of a packet in the bit stream, relative to the start of the stream. Line 9 advances the cursor to the beginning of the first packet header and updates offset. The main loop (lines 10–18) parses the packet header (line 11) and, if the packet belongs to the first video stream, its offset and length are added to filter (line 14). EndOfBitstream is a macro that checks the position of the bit stream cursor against the length of the data buffer.

Once the filter is constructed, it can be saved to disk, used as a parameter to the BitStreamFileFilter or the BitstreamDumpUsingFilter functions. The former reads the subset of a file specified by the filter, the latter copies the data subset specified by a filter from one bit stream to another.

This example illustrates how the toolkit can be used to demultiplex interleaved data. It can be easily extended to other formats, such as QuickTime, AVI, MPEG-2 and MPEG-4. Although this mechanism uses data copies, the cost of copying is offset by the performance gain when processing the filtered data.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A Web-based video-editing system where a client computer accesses, over the Web, a plurality of servers having video data and application programs, the system comprising:

a first plurality of functions for performing data computations;

a second plurality of functions for performing I/O functions;

a third plurality of functions for performing memory allocation, said first, second, and third plurality of functions each performing operations independent of each other, and said first, second, and third plurality of functions used in conjunction with each other to operate upon structural elements in a compressed video bitstream data in a video-editing application; and, means for exposing said structural elements in said compressed video bitstream data in said video-editing application.

2. The Web-based video-editing system of claim 1 wherein said first, second and third pluralities of functions form a library of functions.

3. The Web-based video-editing system of claim 1 further comprising:

a bitstream buffer for storing a portion of said compressed video bitstream data, and said first, second and third plurality of functions operating on said portion of said compressed video bitstream data stored in said bitstream buffer.

4. The Web-base video-editing system of claim 1 further comprising:

search means for searching said compressed video bitstream.

5. The Web-based video-editing system of claim 1 wherein said second plurality of functions for performing I/O functions further comprises:

a means for clipping wherein one object uses memory from another object of the same type.

6. The Web-based video-editing system of claim 1 wherein said second plurality of functions for performing I/O functions further comprises:

a means for casting wherein memory is shared between objects of different types.

7. The Web-based video-editing system of claim 1 further comprising:

a graphical user interface at the client for interfacing with the Web servers.

8. The Web-based video-editing system of claim 1 further comprising:

a video interface on one of the plurality of servers, said video interface using said first, second, and third pluralities of functions to handle messages between the client computer and said one of the servers.

9. The Web-based video-editing system of claim 1 further comprising a video engine on one of the plurality of servers, said video engine using said first, second and third plurality of functions to process video data.

10. The Web-based video-editing system of claim 1 wherein said compressed video bitstream data may be in GIF, JPEG or MPEG format.

11. The Web-based video-editing system of claim 1 further comprising;

a graphical user interface on the client computer;

a video interface on one of the plurality of servers, said video interface having a buffer for compressed video bitstream data, said video interface capable of passing messages between the client computer and the one of said plurality of servers; and, a video engine on one of said servers, said video engine having video processing applications using the first, second and third pluralities of functions in response to messages from said client computer.

12. A method of Web-based video-editing, comprising the steps of:

providing a first plurality of functions for performing data computations;

providing a second plurality of functions for performing I/O functions;

providing a third plurality of functions for performing memory allocation, said first, second, and third plurality of functions having independent functionality;

operating said first, second, and third plurality of functions in combination to operate upon structural elements in a compressed video bitstream data in a video-editing application; and exposing said structural elements in said compressed video bitstream data in said video-editing application.

13. The Web-based video-editing system of claim 4 further comprising:

I-frame search means for searching for a stored event on one of the plurality of servers using I-frames.

14. The Web-based video-editing system of claim 8 wherein said video interface further comprises a buffer for storing a portion of said compressed video bitstream data for processing.

15. The Web-based video-editing system of claim 11 wherein the graphical user interface and the video interface are object-oriented.

16. The method of claim 12, further comprising the steps of:

providing a plurality of servers having the first, second and third pluralities of functions;

providing a client computer; and providing a Web connection between the servers and the client computer, whereby videoprocessing is performed on the servers in response to commands from the client computer.

17. The method of claim 12, further comprising the steps of:

providing, from one of the plurality of servers, a graphical user interface to the client computer in response to a request from the client computer;

establishing a network connection between the client computer and the one of the plurality of servers;

sending video editing messages between the client and the one of the plurality of servers;

processing video data on the one of the plurality of servers in response to the messages; and accessing the first, second, and third plurality of functions in response to processing the video data.

* * * * *